Dale Roeder
Roy F. Weeks
INVENTORS

ATTORNEYS

Jan. 2, 1951     D. ROEDER ET AL     2,536,856
STRAP BRAKE

Filed Nov. 16, 1945     3 Sheets-Sheet 2

DALE ROEDER
ROY F. WEEKS
INVENTORS

BY Edwin C. McRae
R. G. Harris
John Faulkner

ATTORNEYS

Jan. 2, 1951     D. ROEDER ET AL     2,536,856
STRAP BRAKE

Filed Nov. 16, 1945     3 Sheets-Sheet 3

DALE ROEDER
ROY F. WEEKS
INVENTORS

Edwin C. McRae
R. G. Harris
John Faulkner
BY
ATTORNEYS

Patented Jan. 2, 1951

2,536,856

UNITED STATES PATENT OFFICE 2,536,856

STRAP BRAKE

Dale Roeder, Detroit, and Roy F. Weeks, Dearborn, Mich., assignors to Ford Motor Company, Dearborn, Mich., a corporation of Delaware Application November 16, 1945, Serial No. 629,176

9 Claims. (Cl. 188—77)

This invention relates to brake mechanisms for motor vehicles.

An object of the present invention is to provide a brake mechanism in which a rotatable drum is retarded by substantially balanced forces which form a couple about the center of rotation of the drum and prevent an unbalanced stress from being applied to the bearings of the shaft or axle upon which the drum is mounted.

Another object of the invention is to provide a brake of the self-energizing type comprising semi-floating brake friction means in which an equal retarding force is exerted upon the drum in both forward and reverse rotation thereof.

A further object is to provide a brake mechanism including axially spaced brake friction means engageable with a common brake drum and having anchors and actuating means therefor, with the anchors and actuating means for one brake friction means located diametrically opposite the anchors and actuating means for the other brake friction means. This construction may include circumferentially extending external brake bands mounted upon a brake support in a semi-floating manner and arranged to be anchored by abutments formed integrally with the support. The two brake bands are simultaneously actuated by means of a common brake lever connected through an equalizing linkage to the bands.

It is a still further object of the invention to provide a brake of the type described in which hydraulic actuating means are used.

Other objects and advantages of the present invention will be made more apparent as this description proceeds, particularly when considered in connection with the accompanying drawings, in which.

Figures 1, 2:
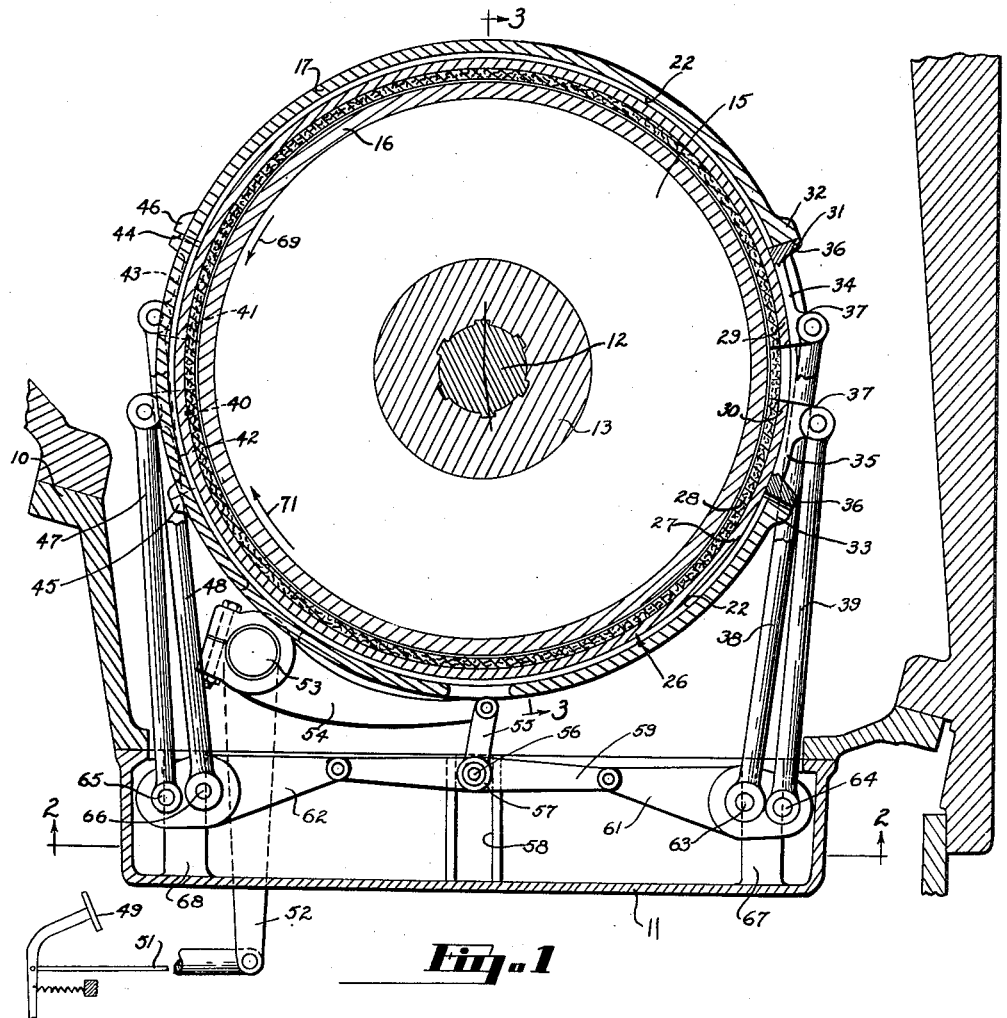
Figure 1 is an elevational view, partially in section, of a brake mechanism embodying the present invention.
Figure 2 is a cross-sectional view taken substantially on the line 2—2 of Figure 1.
Figure 3:
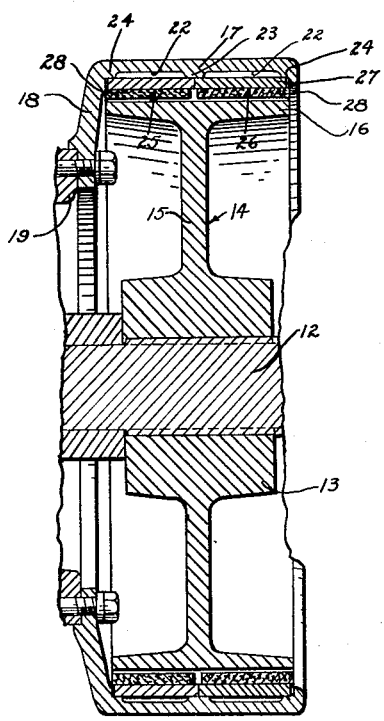
Figure 3 is a cross-sectional view taken substantially on the line 3—3 of Figure 1.
Figure 4:
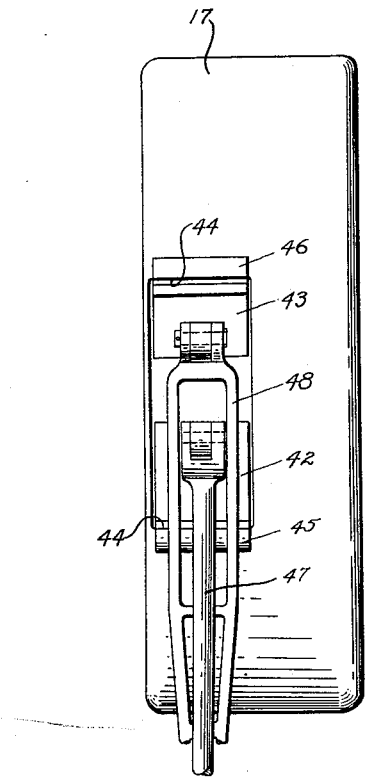
Figure 4 is a left side elevation of the construction shown in Figure 1, with the casing removed.

Referring now to the drawings, and particularly to the construction shown in Figures 1 to 4 inclusive, there is illustrated a brake mechanism designed particularly for use in a tank or other track-laying vehicle. It will be understood, however, that the brake is equally adaptable for use in connection with other types of motor vehicles such as automobiles and trucks.

In the present instance the brake is housed within one end of the cross-drive transmission casing 10 extending transversely between the front drive sprockets of a tank. The casing 10 has a removable lower cover 11 secured thereto. The driven axle 12 of the vehicle has splined thereto the hub 13 of a brake drum 14. The brake drum 14 comprises a radially extending web 15 and an annular brake flange 16. Surrounding the brake drum is an annular brake support 17, connected by a web 18 to a stationary wall 19 of the casing. The interior surface of the brake support 17 is provided with a pair of axially spaced annular grooves 22, forming a rib 23 between the grooves and a pair of annular shoulders 24 at the outer edges thereof.

A pair of semi-floating brake bands 25 and 26 are carried in axially spaced relationship within the annular brake support 17. Each brake band comprises a metal backing strip 27 and a friction lining 28 secured thereto. It will be apparent from Figure 3 that each brake band is supported in its released position upon the rib 23 and one of the shoulders 24 formed in the brake support 17. Clearance between the support and the brake bands is provided by the annular grooves 22.

As best seen in Figure 1, brake band 26 extends circumferentially around the brake drum for substantially the entire extent thereof, having adjacent ends 29 and 30 spaced a short distance from each other. The brake support 17 is provided with a circumferentially extending opening 31 in alignment with the ends of brake band 26. Anchors 32 and 33 are formed integrally with the support 17 at opposite ends of the opening 31. Welded to the ends 29 and 30 of the brake band 26, and extending through the opening 31 in the brake support 17, are brackets 34 and 35 respectively. Each bracket has a flange 36 at one end thereof for engagement with the respective anchor, and an apertured boss 37 at the opposite end. The arrangement is such that a predetermined clearance is provided between the brackets on the brake band and the anchors on the support when the brake band is in its released position. The upper ends of a pair of actuating rods 38 and 39 are pivotally connected to the bosses 37 on the brackets 34 and 35 respectively.

The construction of brake band 25, which is axially spaced from brake band 26, is similar to that of brake band 26. The brake band 25, however, is reversed so that its adjacent ends 40 and 41 are diametrically opposite the ends 29 and 30, respectively, of the brake band 26. Brackets 42 and 43 on the brake band ends 40 and 41, respectively, project through an opening 44 in the brake support 17 and are adapted to engage anchors 45 and 46 formed integrally with the brake support at opposite ends of the opening 44. Clearance between the brackets and the anchors permits a limited circumferential movement of the brake band when the latter is engaged with the drum. Actuating rods 47 and 48 are pivotally connected to the brackets 42 and 43 respectively.

It will be apparent that, upon suitable actuation, the rods 38 and 39 are adapted to contract the brake band 26 into frictional engagement with the exterior surface of the brake flange 16 of the brake drum, and that rods 47 and 48 are adapted to perform the same function in connection with the brake band 25.

The brake bands are operated by a suitable foot pedal 49 connected by means of a brake rod 51 and arm 52 to a brake shaft 53, the latter being journaled in bearings carried in the opposite sidewalls of the casing 10. A bifurcated brake lever 54 is secured to the brake shaft 53 intermediate the ends of the shaft. The ends of the furcations of the brake lever are pivotally connected to a pair of short links 55, the lower ends of which carry a cross shaft 56. Guide rollers 57 are mounted on opposite ends of the cross shaft 56 and are guided within vertical ways 58 formed in opposite sidewalls of the lower casing cover 11.

An equalizing lever 59 is centrally journaled on the cross shaft 56. Opposite ends of the equalizing lever 59 are pivotally connected to a pair of brake applying levers 61 and 62. The lower ends of the control rods 38 and 39 for the brake band 26 are pivotally connected by means of spaced pivot pins 63 and 64, respectively, to the lever 61. Similarly, the lower ends of the control rods 47 and 48 for the brake band 25 are pivotally connected by spaced pivot pins 65 and 66 to the brake applying lever 62. Lateral movement of the brake applying levers 61 and 62 is prevented by means of guideways 67 and 68 integrally formed in the lower casing cover 10.

Operation

When the foot pedal 49 is depressed, the brake shaft 53 and the brake lever 54 carried thereby are rotated, effecting a vertical translation of the cross shaft 56, which is guided in the ways 58 by the rollers 57. Through the equalizing lever 59, the brake applying force is equally distributed between the brake applying levers 61 and 62, rotating the latter in the guideways 67 and 68 respectively.

The resulting rotation of lever 61 applies a downward force to the bracket 34 on the brake band 26, through the control rod 38, and simultaneously applies an upward force to the bracket 35 on the opposite end of the brake band, through the control rod 39. The subsequent contraction of the brake band 26 into frictional engagement with the brake drum causes a limited circumferential movement of the brake band in the direction of rotation of the drum, since the brake band is of the self-energizing, semi-floating type.

In the counterclockwise or forward direction of rotation of the brake drum 14, as indicated by the arrow 69, Figure 1, the brake band 26 is carried by the brake drum in a counterclockwise direction until the bracket 34 engages anchor 32. Continued brake applying force effects a rotation of the brake applying lever 61 about the pivot pin 63, since the control rod 38 acts as a rigid strut or reaction member, and applies the braking force wholly through rod 39 to the end 30 of the brake band.

In the reverse or clockwise rotation of the drum, as indicated by the arrow 71, Figure 1, the self-energizing effect of the brake band moves the band in a clockwise direction until bracket 35 engages anchor 33, after which the control rod 39 acts as a rigid reaction member and pivot point 64 forms a fulcrum for the lever 61.

Inasmuch as the braking force is applied through an equalizing lever 59, the actuating rods 47 and 48 for the brake band 25 are actuated simultaneously with the operation of the actuating rods for brake band 26, and with equal force. Brake band 25 is likewise self-energizing and semi-floating and the brackets 42 and 43 carried thereby are anchored by the anchors 45 and 46 in the forward and reverse directions of rotation, respectively, of the brake drum. From the foregoing it will be apparent that an equal self-energizing effect and retarding force is secured in both the forward and reverse directions of rotation of the drum, thus obtaining equal braking action regardless of whether the vehicle is traveling in forward or reverse speed.

It will also be noted that, inasmuch as the two brake bands 25 and 26 are simultaneously actuated, and the anchors and actuating means for the bands are diametrically opposite each other, equal retarding forces are applied to the drum at opposite sides thereof. This in effect forms a torque couple about the center of rotation of the drum which balances the stress carried by the bearings for the axle 12 and prevents an unbalanced stress from being applied to the axle which would result in undesirable wear thereon. This balancing couple is not achieved in the usual brake construction and accordingly the present construction will have a substantially greater life.

Figure 5:
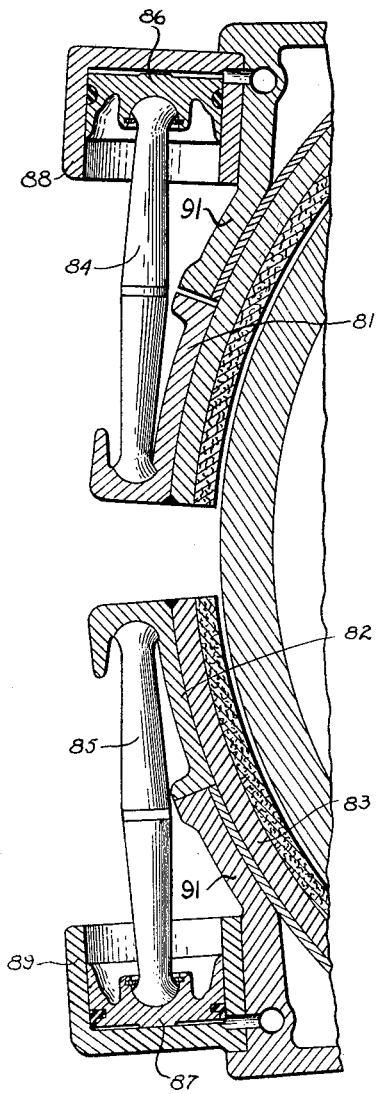
Figure 5 is a fragmentary cross-sectional view of a modification.

Referring now to Figure 5, there is shown a modification in which the brake bands are hydraulically actuated. In general, the construction of the brake mechanism is similar to that shown in Figures 1 to 4 inclusive, but the brackets 81 and 82 on the ends of the brake band 83 are actuated by piston rods 84 and 85 connected to pistons 86 and 87 respectively, the latter being reciprocable in cylinders 88 and 89 carried by the brake support 91. Fluid under pressure for operating the pistons is supplied in the conventional manner. It will be apparent that the above described hydraulic means exerts equal braking effort upon opposite ends of the brake bands, resulting in an operation thereof which obtains results similar to those achieved with the mechanical construction shown in Figures 1 to 4 inclusive.

Figure 7:
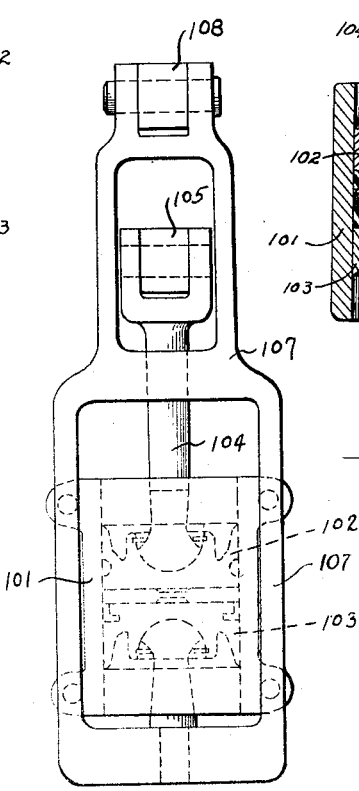
Figure 7 is an end elevation of the construction shown in Figure 6.
Figure 6:
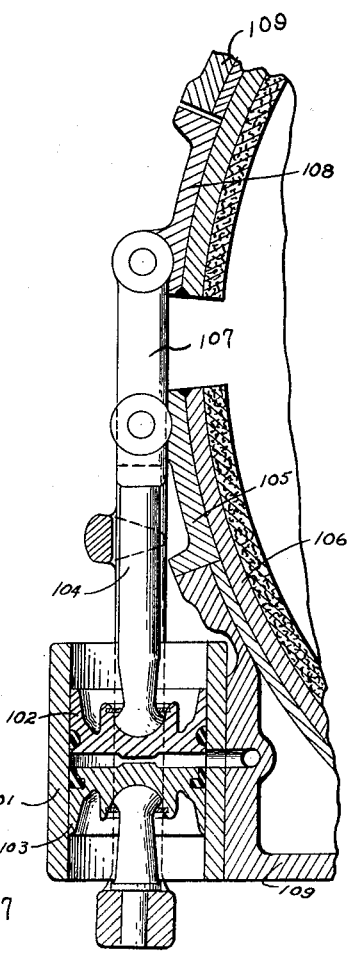
Figure 6 is a fragmentary cross-sectional view of another modification.

Figures 6 and 7 illustrate another modification of the invention in which a single double acting hydraulic cylinder 101 is utilized in place of the two cylinders shown in Figure 5. Fluid under pressure is introduced into the cylinder 101 between pistons 102 and 103 which are reciprocably mounted therein. Piston 102 operates through a compression link 104 to move the bracket 105 on the brake band 106 upwardly. Piston 103 engages the yoke 107 which encircles the brake cylinder 101 and the link 104 and has its opposite end pivotally connected to the bracket 108 on the opposite end of the brake band. The double acting brake cylinder 101 is mounted upon the brake support 109 and forms a compact efficient structure.

It will be understood that the invention is not to be limited to the exact construction shown and described, but that various changes and modifications may be made without departing from the spirit and scope of the invention, as defined in the appended claims.

What is claimed is:

1. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, said support comprising an annular flange encircling said brake band and said drum, said annular flange having guides thereon for guiding and supporting said brake bands when the latter are released from said drum, torque reaction means for the ends of said brake bands arranged to permit a limited circumferential movement of said brake bands, and actuating means for simultaneously applying said brake bands to said drum.

2. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, said support comprising an annular flange encircling said brake bands and said brake drum, said annular flange having a pair of axially spaced annular grooves on its inner surface forming an annular rib between said grooves and an annular shoulder adjacent the outer edge of each of said grooves, said rib and said shoulders providing means for guiding and supporting said brake bands when the latter are released from engagement with said drum, torque reaction means for the ends of said brake bands arranged to permit a limited circumferential movement of said brake bands, and actuating means for simultaneously applying said brake bands to said drum.

3. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, said support comprising an annular flange encircling said brake bands and said brake drum, said support having a pair of diametrically opposite elongated openings each in alignment with the ends of one of said brake bands, brackets on the ends of said brake bands projecting outwardly through said openings, torque reaction means for the ends of said brake bands arranged to permit a limited circumferential movement of said brake bands, and actuating means connected to said brackets for simultaneously applying said brake bands to said drums.

4. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, said support comprising an annular flange circling said brake bands and said brake drum, said support having a pair of diametrically opposite elongated openings each in alignment with the ends of one of said brake bands, torque reaction anchors carried by said supports adjacent the opposite ends of said openings, brackets on the ends of said brake bands projecting outwardly through said openings and adapted to engage said anchors, said brackets being arranged to provide a predetermined clearance between the brackets and the anchors when said brake bands are released and permitting a limited circumferential self-energizing movement of said brake bands in the direction of rotation of said drum, and actuating means connected to said brackets for simultaneously applying said brake bands to said drum.

5. A brake mechanism comprising a rotatable brake drum, a support, a pair of axially spaced brake friction means mounted on said support and adapted to engage said drum, brake applying means for said friction means located at diametrically opposite sides of said drum, a pair of floating levers engageable with said brake applying means, said brake applying means comprising a pair of actuating rods connected to opposite ends of each of said brake friction means, means connecting said actuating rods to said floating levers, equalizing means connecting said levers, guide means for said equalizing means, and a manually operable brake lever engageable with said equalizing means for applying force thereto to move the latter in said guide means.

6. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, torque reaction means for the ends of said brake bands arranged to permit a limited circumferential movement of said brake bands, and actuating means for simultaneously applying said brake bands to said drum, said actuating means comprising a hydraulic cylinder and piston for each end of each brake band, said cylinders being mounted on said support and said pistons being connected to said brake band ends.

7. In a brake, a rotatable brake drum, a support, a pair of axially spaced brake bands mounted on said support and encircling said drum with the opposite ends of each of said brake bands spaced a short distance apart and the ends of one brake band located substantially diametrically opposite the ends of the other brake band, torque reaction means for the ends of said brake bands arranged to permit a limited circumferential movement of said brake bands, and actuating means for simultaneously applying said brake bands to said drum, said actuating means comprising a double acting hydraulic cylinder for each of said brake friction means, a pair of opposed pistons in each of said cylinders, compression struts connecting one piston in each cylinder to one end of each friction means, and a tension yoke conecting the other piston in each cylinder to the other end of each friction means.

8. In a rotatable brake drum, a support, a pair of axially spaced brake bands mounted upon said support and encircling said drum with the opposite ends of each of said brake bands spaced a short distance apart and with the ends of one brake band located substantially diametrically opposite the ends of the other brake band, said support comprising an annular flange encircling said brake bands and said drum and having guide means thereon for guiding and supporting said brake bands when the latter are released from said drum, anchoring means for each of said brake bands, and actuating means for moving said brake bands into frictional engagement with said brake drum to retard rotation of the latter.

9. The structure defined by claim 8 which is further characterized in that said anchor means are carried by said support, and said support is formed with a pair of diametrically opposite elongated openings each in alignment with the ends of one of said brake bands and with said actuating means being connected to said brake bands through said opening.

DALE ROEDER.
ROY F. WEEKS.

REFERENCES CITED

The following references are of record in the file of this patent:

UNITED STATES PATENTS

| Number | Name | Date |
| --- | --- | --- |
| 1,598,774 | Gunn | Sept. 7, 1926 |
| 1,673,211 | Staude | June 12, 1928 |
| 2,020,404 | Farkas | Nov. 12, 1935 |
| 2,027,874 | Nall | Jan. 14, 1936 |
| 2,098,125 | Yoxall | Nov. 2, 1937 |